United States Patent Office 3,743,689
Patented July 3, 1973

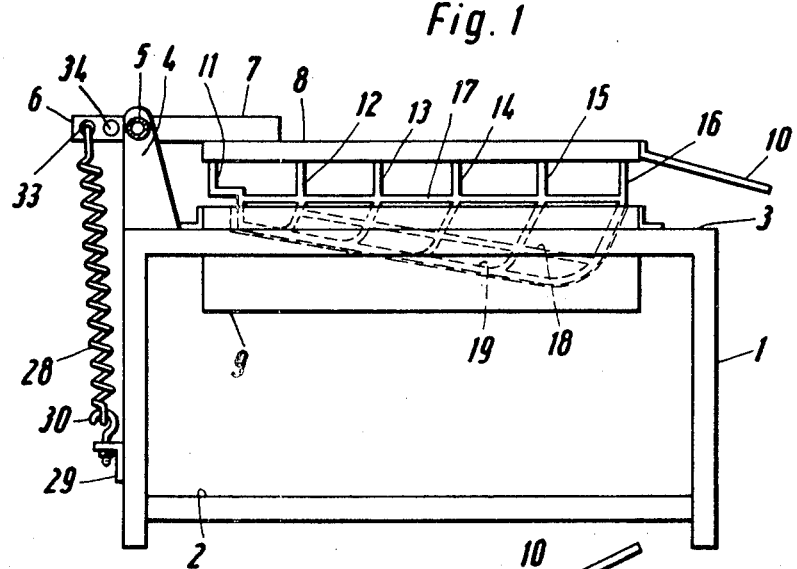
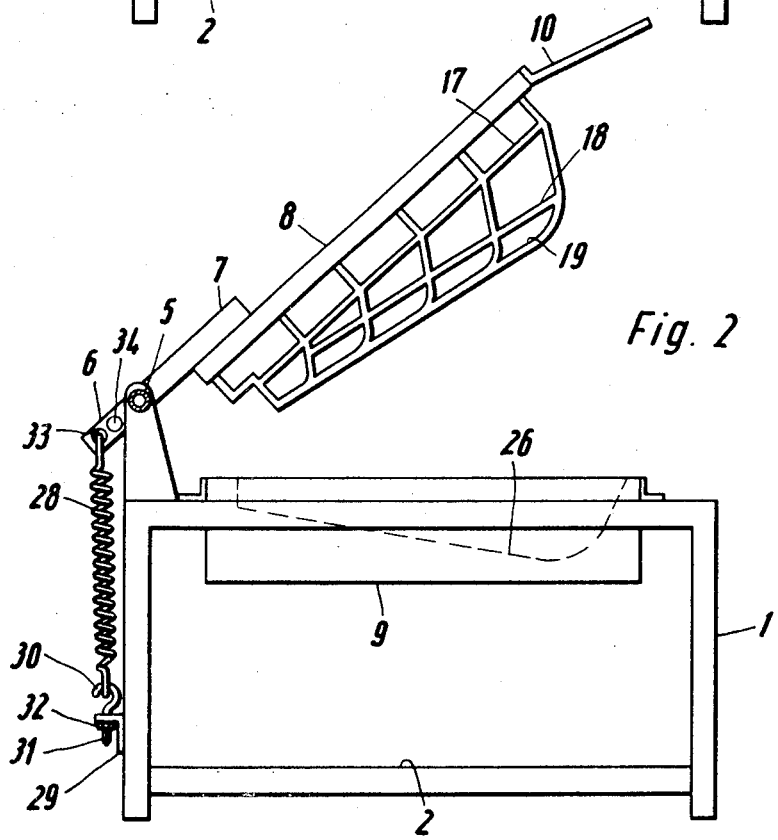

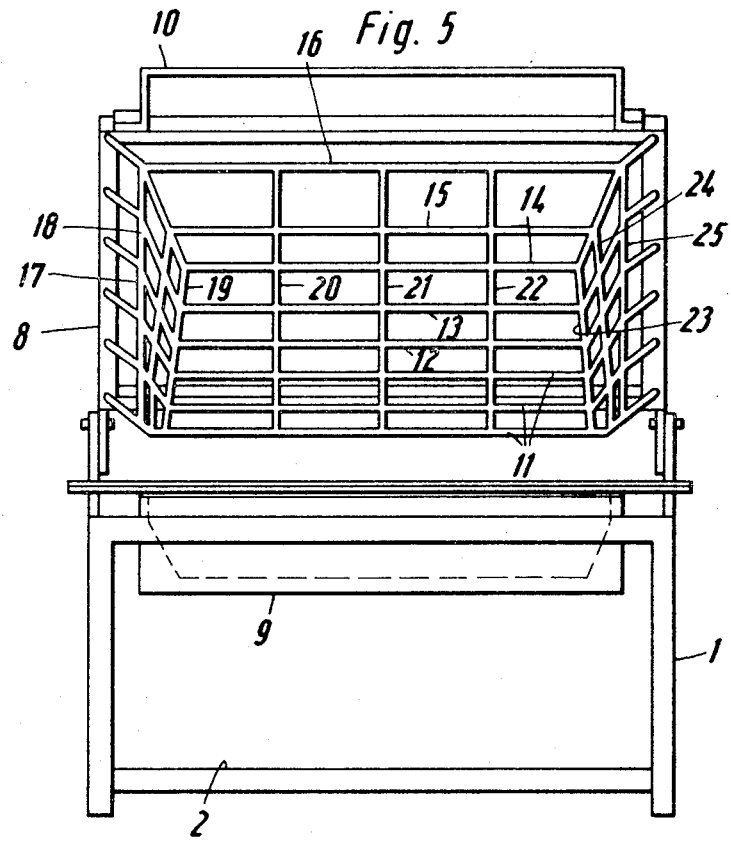

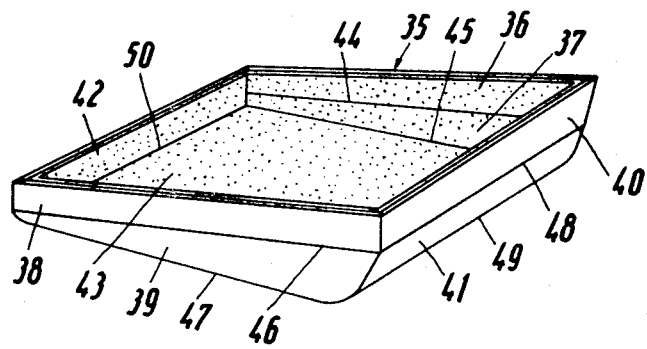
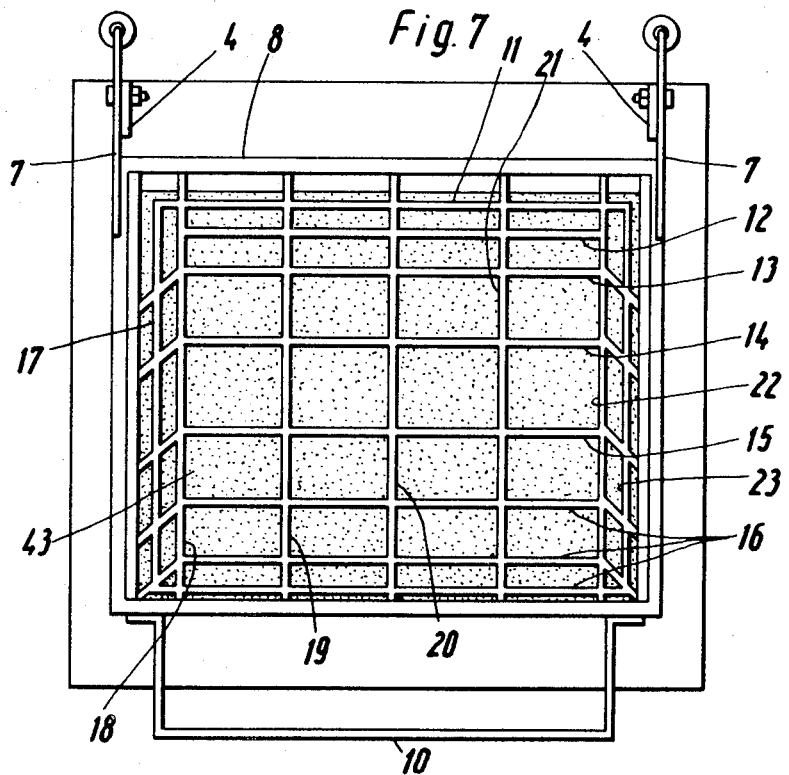

3,743,689
METHOD FOR MANUFACTURING SHAPED ARTICLES FROM FABRIC SECTIONS
Benno Saladin, Sirnach, Switzerland, assignor to Saladin A.G., Sirnach, Switzerland
Original application Jan. 27, 1969, Ser. No. 793,978, now Patent No. 3,635,629, dated Jan. 18, 1972. Divided and this application Mar. 4, 1971, Ser. No. 120,864
Claims priority, application Germany, Apr. 1, 1968, P 17 78 135.0
Int. Cl. B29c 17/04
U.S. Cl. 264—92    5 Claims

ABSTRACT OF THE DISCLOSURE

A shaped article, such as a floor covering for a vehicle, is made from a plurality of interconnected sections of fabric having a pile and including a thermosetting or thermoplastic plastics material. During forming of the article on a two-part press, en order to prevent the pile from being flattened, the pile surface of the joined together and properly oriented sections is engaged by a grid-like press part only in the regions of the joints between the section. The press includes a trough-shaped receiving press part and a pivotally mounted top press part which is movable to engage over the article which is positioned in the trough-shaped part. The top press part is favored as a grid with projecting portions such as tubes which engage the article being formed at least at the junctures of sections or portions of the article which are to be arranged at an angle to one or more other portions. The tubes advantageously carry means for selectively cooling or heating the article to apply a desired thermal treatment for permanently forming the article.

This is a division of application Ser. No. 793,978, filed Jan. 27, 1969, now Pat. No. 3,635,629.

SUMMARY OF THE INVENTION

This invention relates to a method for making a shaped article from sections and, in particular, to a method for the thermal and pressure treatment of fabric having a pile and including thermoplastic or thermosetting plastics material to form it into a shaped article.

Such fabrics are employed, for example, as floor coverings of passenger carrying vehicles, more especially motor vehicles. As is known, the floors of motor vehicles (and also of aircraft cockpits or the like) are necessarily profiled, in the case of motor vehicles due to the presence of the transmission tunnel enclosing the drive shaft to the rear wheels. Motor vehicle floors are thus divided into troughs in which are received the feet of the occupants.

A profile corresponding to that of the floor must be given to the floor covering, which in most cases consists of woven, knitted, or other fabrics having a pile on the side facing the passenger of the vehicle. Such floor coverings may have, moreover, thermoplastic and/or thermosetting plastics covering layers or may be reinforced by layers of such plastics, or impregnated therewith. The underside of the floor covering may be provided with such a layer to give the floor covering non-slip properties after it has been laid.

The forming of such profiled floor coverings, for instance in the form of carpets, has already been accomplished by means of hot pressing. Floor covering and carpet retain the three-dimensional profile imparted to them in this way, but the pile is inadvertently subjected to an "ironing" process during the hot pressing operation and is flattened and loses its normal characteristics. Moreover, it is not possible to observe the product during manufacture. If the floor covering is inserted incorrectly into the press, then permanent creases are formed in the artificial resin layers and very often lead to the finished products being rejected as substandard.

According to the present invention there is provided a method of making a shaped article from fabric sections having a pile and including a thermoplastic or thermosetting plastics material, wherein to shape the article, pressure is applied to the article solely in the regions of the joints between the sections making up the article.

The invention also provides a method employing apparatus for making a shaped article from sections of fabric having a pile and at least one layer consisting at least partly of a thermoplastic or thermosetting plastics material, the apparatus comprising a first press part for engaging the underside of the article, and a second press part for engagement with the upper, pile side of the article, said second press part including a structure having a grid-like form adapted to engage the article solely in the regions of the joints between the sections making up the article. The grid-like structure may be made up from bars, webs or tubes.

With the aid of such a device it is possible to restrict the pressure substantially to and to concentrate it on, the joints between the sections. It is not necessary for the bars, webs or tubes which may constitute the grid-like structure of the second press part to have a circular cross section. If the cross section is, on the contrary ogival, ovoid or elliptical, for example, so that the member has a narrow edge, then the "ironing-down" effect on the pile can be fully or almost fully eliminated, or at any rate made inconspicuous. By a careful arrangement of the location of the joints, it is possible to make them unnoticeable in the finished article.

It is also possible to treat the joints thermally and/or chemically. This is readily possible because the grid-like structure may be constituted by tubes including connections for heating or cooling media and/or chemically acting substances. Alternatively, the grid-like structure may be made up from bars or webs including electrical heating coils or Peltier elements for cooling the bars. A brief heating of the bars, webs or tubes is sufficient to obtain the desired thermoplastic deformation if the layer consists of thermoplastic plastics. Nevertheless, "ironing down" of the pile does not occur if a cooling procedure carried out directly after the softening of the thermoplastic layer is used to counteract the ironing effect, and the pile reassumes its alignment normal to the plane of the textile.

As a result of the grid-like form of the first press part, the article can be constantly observed during the pressing operation, and adjustments to the position of the article can be made the instant they are necessary.

Although in accordance with the invention, substantially only the joints between the sections are subjected to pressure, it is also possible to apply pressure to the fabric over its entire surface, without harming the pile. This can be achieved if, before, during and/or after the exertion of the mechanical pressure, the sections joined together into the finished article are exposed, by means of the inducement of suction on the under-side of the fabric, to the action of the ambient pressure on the other side of the fabric. Since, through such a measure, the pile of the fabric is not pressed down relative to the fabric, the desired deformation of the entire surface is obtained.

Specific embodiments of the invention will now be described by way of example with reference to the accompanying drawings in which:

FIG. 1 is a side elevation of a press in the closed position,

FIG. 2 illustrates the press shown in FIG. 1 in the open position,

FIG. 3 shows a cross section through a floor covering prior to deformation,

FIG. 4 shows a cross section through the floor covering after deformation,

FIG. 5 is a front elevation of the open press shown in FIG. 2,

FIG. 6 represents diagrammatically in perspective a deformed floor covering,

FIG. 7 shows a plan view of the press shown in FIG. 1, viewed from above, and

Figure 8:
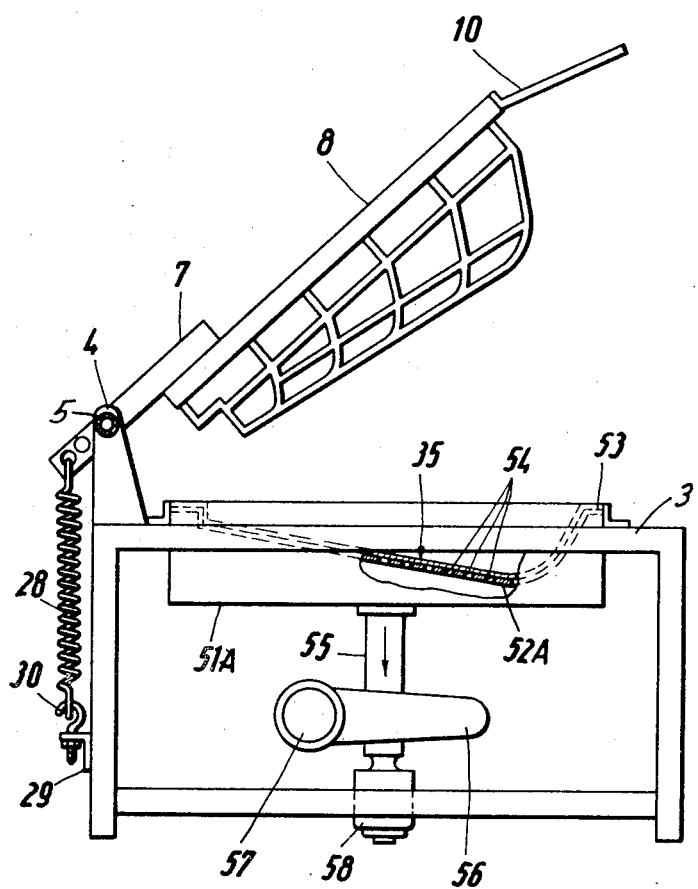
FIG. 8 shows a second embodiment of press.

The press shown in FIGS. 1, 2, 5 and 7, comprises a rigid frame consisting of uprights 1 reinforced by cross struts 2 and at the top supporting a plate 3. The plate 3 carries upstanding brackets 4 mounting a horizontal pivot or spindle 5 which serves for mounting two laterally spaced two-armed levers each having a short arm 6 projecting beyond the frame and a longer arm 7. The arms 7 together support a movable press part 8. The movable press part 8 is manually operable by a handle 10, and supports a grid-like structure or framework consisting of cross bars 11 to 16 interconnected by longitudinally extending bars 17 to 25. The configuration of the bars constituting the framework is more clearly seen in FIG. 5. The bars 11 to 25 are so arranged that they correspond to the pattern of the joints between the various fabric sections or parts of the article which are arranged in a plane distinct from other parts. The article to be formed may be a floor covering for a motor vehicle, for example, which may be formed from a single sheet. The press also includes a stationary press part 9 which is supported by the table 3 and is formed with a female mould cavity 26 corresponding in shape to the envelope of the underside of the framework 11 to 25.

If the press is hand operated, tension springs 28 are provided to act on the over-hanging arms 6 and provide compensation for the weight of the moving press part. The other ends of the springs are fixed at 29 on the frame 1 of the press. A hook 30 for retaining the spring has a screw threaded shank 31 with a wing nut 32 threaded thereon so that the tension of the spring 28 can be adjusted. It is also possible to link the spring 28 with the arm 6 at different points such as 33, 34 so as to vary the moment acting on the two-armed levers.

FIG. 6 shows a floor covering in the form of a trough-shaped carpet 35. The carpet is constituted from sections 36 to 43, joined along lines 44 to 50. Some of these reference numerals also appear in FIGS. 3 and 4 which show in cross section the carpet blank and the formal carpet before and after deformation, respectively. The pile is represented diagrammatically at 51. The under or rear side 52 of the floor covering 35 consisting of a woven or knitted fabric is impregnated with a thermoplastic plastics material. The stiffening of the thermoplastic plastics material by thermal and/or pressure treatment permits the permanent deformation of the woven or knitted fabric.

The embodiment shown in FIG. 8 corresponds to that of FIGS. 1, 2, 5 and 7, with the difference that the stationary press part is not solid (as in the case of the part 9 of FIG. 2), but is in the form of a hollow box 51A. Accordingly, the female mould is in the form of a shell 52A, whose rim is reinforced at 53 and is braced on the frame plate 3. The shell is perforated, as at 54. The interior of the box 51A communicates via a connecting piece 55 with the suction side of an extractor fan 56 having an outlet 57 to atmosphere. The suction fan 57 is driven by a motor 58. The fan 57 induces a suction in the box 51A, the suction acting via the perforations 54 on the floor covering 35 inserted into the mould. Owing to the suction acting on its underside, the floor covering 35 is thereby pressed against the shell 52 of the mould by the ambient pressure. The suction fan 56, 57 can of course be replaced by any other suction inducing apparatus, such as a vane-type or other pump, or to a common vacuum line.

In operation, an undeformed or an already predeformed floor covering 35 is deposited (with the press mould open in accordance with FIGS. 2, 5 and 8) into the mould formed in the stationary press part. The press is then closed by lowering the upper press part. In so doing, the floor covering has been introduced into a state in which, as a result of suitable heating, it is thermoplastically deformable. Thereafter, the bars 11 to 25 are cooled to a substantially lower temperature, e.g. by circulating a coolant through channels defined therein, and are applied to the joints 44 to 50 shown in FIG. 6, so that the thermoplastic regions are instantaneously cooled down and thereby hardened. These hardened joints thus impart the desired shaping to the floor covering 35, whereby the realization and maintenance thereof is fostered by the ensuing pressure. If the floor coverings have thermosetting plastics in the form of enclosed layers or layers distributed by impregnation or spraying, then the solid bars or webs in the upper press part are replaced by tubes for conducting a heating medium, so that the thermosetting plastics become set. The same effect can be achieved by heated bars or webs.

In the case of the embodiment of FIG. 8, after the insertion of the floor covering 35 with plasticized thermoplastics content, the suction fan 56 is operated so that the atmosphere on the one hand, and the bars 11 to 25 on the other hand, cause a three-dimensional shaping of the covering 35. If the bars are replaced by tubes, then the effect can be further reinforced if the tubes are connected to a cooling medium supply. The cooling medium is fed via the hollow spindle 5 to the tubes 11 to 25. Assuming the presence of thermosetting plastics layers in the floor covering 35, superheated steam, for example, is fed via the hollow spindle 5 to the tubes 11 to 25.

The handle 10 or spring 28 can, of course, be replaced by powered operation of a mechanical, pneumatic, hydraulic, electromechanical or electromagnetic type. For example, an electric motor can be arranged to drive a worm meshing with a worm wheel segment arranged concentrically to the spindle 5 and rigidly connected to the lever arm 7. Upon current supply the motor raises or lowers the moving part of the press mould. Limit switches may be provided to stop the motor when the moving press part reaches either of its end positions.

What is claimed is:

1. Method of forming fabric made up of a plurality of sections with the edges of adjacent sections disposed in adjoining relationship to form joints, such fabric having an outer pile layer and at least one shape forming layer consisting of a deformable and settable plastic material, into a shaped article having a three-dimensional form, comprising the steps of positioning the fabric on a support surface having the desired three-dimensional form with the pile layer facing outwardly from the support surface, applying mechanical pressure along the joints between the edges of adjoining sections of the fabric directed toward the support surface to conform the fabric to the support surface while maintaining the remaining portions of the pile layer free from mechanical pressure so that visual observation of the remaining portions of the pile layer can be effected, and setting the shape forming layer with the fabric in the desired three dimensional form.

2. Method of forming fabric into a shaped article, as set forth in claim 1, including the further steps of applying the mechanical pressure to the fabric along spaced portions separating the fabric into different planes.

3. Method of forming fabric into a shaped article, as set forth in claim 1, including the further step of, in addition to mechanical pressure, establishing a suction acting on the side of the fabric positioned on the support surface, and maintaining atmospheric pressure acting on the pile layer side of the fabric.

4. Method of forming fabric into a shaped article, as set forth in claim 1, including the further step of thermally treating the portion of the fabric against which mechanical pressure is applied for assisting in the formation of the shaped article.

5. Method of forming fabric into a shaped article, as set forth in claim 1, including the further step of applying the effect of a chemical reaction to the portion of the fabric against which mechanical pressure is applied for assisting in the formation of the shaped article.

References Cited

UNITED STATES PATENTS

| | | | |
|---|---|---|---|
| 3,390,482 | 7/1968 | Holtvoigt | 264—92 X |
| 3,115,678 | 12/1963 | Keen et al. | 264—322 X |
| 2,258,238 | 10/1941 | Collins | 156—285 X |
| 2,234,839 | 3/1941 | Edwards | 264—292 X |

FOREIGN PATENTS

| 1,018,180 | 1/1966 | Great Britain | 264—92 |
|---|---|---|---|

ROBERT F. WHITE, Primary Examiner

J. H. SILBAUGH, Assistant Examiner

U.S. Cl. X.R.

264—257, 292, 322, 327